United States Patent [19]

Dilgren et al.

[11] 4,086,964
[45] May 2, 1978

[54] STEAM-CHANNEL-EXPANDING STEAM FOAM DRIVE

[75] Inventors: Richard E. Dilgren; George J. Hirasaki; Harold J. Hill; Derrill G. Whitten, all of Houston, Tex.

[73] Assignee: Shell Oil Company, Houston, Tex.

[21] Appl. No.: 801,271

[22] Filed: May 27, 1977

[51] Int. Cl.$^2$ ............................................. E21B 43/24
[52] U.S. Cl. ................................. 166/272; 166/252; 166/274
[58] Field of Search ............... 166/252, 272, 274, 275, 166/303

[56] References Cited

U.S. PATENT DOCUMENTS

| | | | |
|---|---|---|---|
| 3,367,419 | 2/1968 | Lookeren | 166/272 X |
| 3,412,793 | 11/1968 | Needham | 166/272 X |
| 3,706,341 | 12/1972 | Redford | 166/272 X |
| 3,771,598 | 11/1973 | McBean | 166/272 X |
| 3,796,262 | 3/1974 | Allen et al. | 166/272 |
| 3,847,219 | 11/1974 | Wang et al. | 166/272 X |
| 3,948,323 | 4/1976 | Sperry et al. | 166/303 |
| 3,994,345 | 11/1976 | Needham | 166/303 |

FOREIGN PATENT DOCUMENTS

1,004,977  2/1977  Canada ................................ 166/272

Primary Examiner—Stephen J. Novosad
Assistant Examiner—George A. Suchfield

[57] ABSTRACT

In a viscous oil reservoir in which the stratification of the rock permeability is insufficient to confine steam within the most permeable strata, oil can be produced by forming and expanding a steam channel through which steam is flowed and oil is produced. Steam is injected and fluid is produced at rates causing a steam channel to be extended between locations that are horizontally separated. A foam-forming mixture of steam, noncondensable gas and surfactant is then injected into the steam channel to provide foam and a relatively high pressure gradient within the channel, without plugging the channel. A flow of steam-containing fluid through the steam channel is continued in a manner such that the magnitudes of the pressure gradient, the rate of oil production, and the rate of steam channel expansion exceed those which could be provided by steam alone.

10 Claims, 6 Drawing Figures

STEAM-CHANNEL-EXPANDING STEAM FOAM DRIVE

BACKGROUND OF THE INVENTION

The invention relates to a steam-drive process for producing a viscous oil or tar. More particularly, the invention provides a process for recovering oil from a subterranean viscous oil reservoir, or at least a portion of such a reservoir, in which the stratification due to differences in the absolute permeabilities of the individual layers of the rocks is not sufficient to cause a significant portion of the injected steam to flow through only one or a few layers of exceptionally high permeability.

Numerous prior processes have been suggested for producing an oil or tar from such a relatively non-stratified reservoir. For example, the J. Van Lookeren patent No. U.S. Pat. No. 3,367,419 suggests injecting steam and producing fluid at laterally spaced locations and, after steam breakthrough, reducing the tendency for steam to bypass the production locations by producing from them at rates that reduce the pressure within the steam channel, to less than that in other portions of the reservoir. The R. W. Durie patent U.S. Pat. No. 3,439,742 suggests opening injection and production wells into the lower portion of a reservoir in which an oil zone of low effective permeability overlies a water zone of high permeability, then injecting steam and producing fluid in a manner that forms a steam channel (located along the upper part of the lower zone) between the injection and production locations. The R. W. Bowman patent U.S. Pat. No. 3,682,244 suggests that where an oil layer of low effective permeability overlies a water layer of high effective permeability, steam be injected and fluid produced at locations within the water layer and, whenever steam breakthrough becomes imminent at a production location, plugging back the bottom portion of the well at that location. U.S. Pat. No. 3,771,598 suggests injecting steam and producing fluid at spaced locations within a viscous oil reservoir and, when steam breaks through at the nearest production location, throttling that production well and increasing the injection pressure, then repeating such steps relative to each producer, to avoid heat losses (via casing vent gas) while increasing the temperature and pressure within the steam channel. U.S. Pat. No. 3,796,262 suggests injecting steam and producing fluid at laterally spaced locations within a viscous oil reservoir, injecting faster than producing so that the pressure and temperature in the reservoir is increased, and then terminating the injection while producing fast enough to reduce the reservoir pressure to at least the flash point of water in the reservoir. The K. H. Wang, M. Prats and D. A. Campbell patent U.S. Pat. No. 3,847,219 suggests injecting steam and producing fluid at laterally spaced locations within a reservoir in which an oil layer of low effective steam permeability overlies a water layer of high effective steam permeability until a steam channel extends between the injection and production locations, then throttling the production while maintaining a sufficient injection rate to attain and maintain a relatively high pressure during a heating cycle, and then producing the heated oil at an increased rate during a low depressurization of the heated zone. U.S. Pat. No. 3,948,323 suggests steam soaking a viscous oil reservoir by injecting steam mixed with noncondensable gas until the injectivity to that fluid is diminished, due to hot mobile oil being displaced into a cooler zone where it becomes less mobile and reduces the effective permeability to steam, then injecting hot noncondensable gas free of steam, repeating to the extent required to heat a radial zone of significant size, and then backflowing to to produce the heated oil.

Also, numerous prior processes have involved various uses of steam in conjunction with a surfactant. For example, U.S. Pat. No. 3,292,702 suggests a steam soak process in which an aqueous surfactant is injected ahead of the steam and is said to provide an increased injectivity during the steaming period and a greater rate of production during the backflow. U.S. Pat. No. 3,357,487 suggests injecting a solution of surfactant prior to or during a steam injection so that a band of the surfactant solution is displaced by the steam. U.S. Pat. No. 3,412,793 suggests that, in a relatively highly stratified reservoir in which considerable differences in the permeabilities of the different strata cause significant proportions of an injected gas to flow into only the more permeable strata, a steam soak or steam drive process for recovering oil is improved by temporarily plugging the more permeable strata with foam. And, the control of how long such plugs are effective is improved by using steam as the gas phase of the foam. About eight years after applying for the U.S. Pat. No. 3,412,793, the same inventor applied for U.S. Pat. No. 3,994,345 relating to an improvement relative to a steam soak process for recovering oil. The improvement seeks to maximize the duration of the plugging effects of such steam foam plugs, so backflowing well shortly after the steam is injected does not cause live steam to flow through the more permeable strata and return to the production well. The U.S. Pat. No. 3,994,345 suggests injecting steam, injecting a foamforming material, and backflowing the well so that the steam then contacts the foaming agent to form a steam-blocking foam plug within the more permeable strata.

The T. K. Smith, Y. C. Chiu, J. B. Lawson patent U.S. Pat. No. 3,707,193 discloses that in a steam foam used for well cleaning operations, the noncondensable gas component of a steam foam-forming mixture of steam, noncondensable gas and surfactant, significantly increases the density, viscosity and weight-supporting capacity of a column of steam foam.

SUMMARY OF THE INVENTION

This invention relates to a process for producing oil from at least a portion of a subterranean viscous oil reservoir. Steam is injected and fluid is produced at horizontally-spaced locations within a portion of the reservoir in which a steam flow path tends to rise or fall in response to the effects of gravity or oil distribution, rather than remaining within the most permeable ones of a series of strata of different absolute permeability. The rates of steam injection and fluid production are maintained at values such that a steam breakthrough into a production location becomes at least substantially imminent and an extension of a steam channel from an injection location to a production location is at least substantially complete. The composition of the fluid being injected is then changed from steam to a steam foam-forming mixture consisting essentially of steam, noncondensable gas and an aqueous electrolyte-containing solution or dispersion of surfactant. The composition of the steam foam-forming mixture is correlated with the properties of the rocks and fluids within the reservoir so that the pressure required to inject the mixture and the foam it forms or comprises into and through the steam channel exceeds that required for steam alone but is less than the reservoir fracturing pressure. The composition of the fluid being injected into and displaced through the steam channel is adjusted to the extent required to maintain a flow of both steam and foam within the channel in response to a relatively high pressure gradient, at which the oil-displacing and channel-expanding effects are significantly greater than those provided by steam alone, without plugging the channel.

DESCRIPTION OF THE INVENTION

In a viscous oil reservoir, the rocks may be capable of exhibiting high vertical and horizontal absolute permeability, although the mobility (e.g., permeability divided by viscosity) of fluid within the reservoir may be low and/or inhomogeneous due to the presence of viscous oil within some or all of the pore spaces. In such a relatively non-stratified reservoir, the fluids tend to be, or to become, segregated by density. When a stratification of mobility is encountered it is usually due to the distribution of the oil; for example, in a layer above a water-rich, or below a gas-rich, portion of the reservoir.

When steam is flowed through such a reservoir at a pressure less than the fracturing pressure, the steam tends to form a finger or channel that follows the path of least resistance. Such a channel usually rises and runs along the upper portion of the reservoir, due to the effects of gravity. However, where an oil-rich layer overlies a water-rich layer, the steam channel may run along the upper portion of the water layer, near its junction with the oil layer. As known to those skilled in the art, in such reservoirs, a steam channel can be relatively quickly formed and extended between horizontally separated injection and production locations; for example, by injecting steam at a pressure near but less than the fracturing pressure while producing fluid as rapidly as possible.

After a steam-channel has been extended into a production location it provides a relatively highly-permeable path, or zone of high mobility, through which substantially all of the steam can flow. Initially the pressure gradient within such a steam channel is apt to be high, because the fluid in the rocks through which the steam channel extends then includes enough of the viscous oil to provide a relatively low mobility. However, the oil within the interior (or generally central or most permeable portion) of the channel is relatively quickly heated and displaced by the steam, since it is flowing under a relatively high pressure gradient. The heating and displacing of the oil increases the mobility of the fluid and reduces the pressure gradient within the channel. The rate of oil production is drastically reduced as soon as substantially all of the oil has been displaced from the interior of the channel. From then on, the only portions of the steam channel in which there is significant contact between the steam and the oil tend to be those along the periphery of the channel. And, the heating and the oil-displacing efficiency of the steam is low, due to the low pressure gradient that now exists within the channel.

In a relatively highly stratified reservoir in which there is a considerable difference in the permeability of the rock strata, so that the injected steam tends to flow through only the most permeable layers, both the reduction in the rate of oil production and the decrease in the amount of contact between the steam and the oil are aggravated by the permeability differences. The steam tends to stay within the most permeable strata while the oil tends to stay within the less permeable strata, and less oil is heated and moved through the steam channel.

The present invention is, at least in part, premised on the discovery that, where a steam channel extends between horizontally separated injection and production locations in a reservoir formation in which the path of a steam finger or channel is free to move vertically in response to the effects of gravity or oil distribution (rather than remaining within the individual layers of greatest absolute permeability), the rate of oil production can be increased by decreasing the mobility of the steam-containing fluid within the channel. And, the mobility can be reduced by: (A) injecting a steam foam-forming mixture that both consists essentially of steam, noncondensable gas and an aqueous electrolyte-containing solution or dispersion of surfactant and has a composition that is correlated with properties of the rocks and fluids in the reservoir so that the pressure gradient required to inject the mixture and the foam it forms into and along the steam channel is greater than that required for steam alone, but is less than the reservoir fracturing pressure; and (B) adjusting the composition of the fluid being injected to the extent required to maintain a flow of both steam and foam within the steam channel in response to a pressure gradient at which the oil-displacing and channel-expanding effects are significantly greater than those provided by steam alone, without plugging the channel.

The present process for increasing the pressure gradient within a steam channel, within the presently specified type of reservoir formation, avoids the disadvantages of previously proposed procedures for maintaining a suitable rate of oil production after a steam breakthrough within such a reservoir. It avoids the decrease in oil production rate that results from reducing the pressure within the steamswept zone to less than that in the surrounding reservoir. It increases the rate at which the steam channel is expanded, relative to that obtainable by simply circulating steam through the channel under a low pressure gradient. And, it avoids the danger of diverting the steam (and extending the steam channel) into locations other than the selected production locations which danger is created by applying a back pressure on the fluids being produced (whether or not an increase is made in the steam injection pressure.).

The present process also involves a discovery that, within the specified type of reservoir formation, the mobility of the fluid within a steam channel can be reduced, to increase the pressure gradient within the channel, by injecting or forming a foam within the channel — without plugging the channel. In the light of the laboratory and field tests, the capability of doing this appears to depend upon a substantially critical combination of steam with (A) an effective proportion of noncondensable gas, e.g., at least about 0.0003 mole fraction of the injected fluid, and (B) an aqueous surfactant system having foam-formation and rock-adsorption properties at least substantially equivalent to those of an aqueous electrolyte-containing sodium dodecylbenzene sulfonate surfactant system. The discovery of the criticality of the composition of that foam-forming mixture was unobvious in view of prior teachings and beliefs regarding the behavior of foams in reservoir formations.

The plugging tendencies of noncondensable gas foams are well known. For example, a journal article by L. W. Holm, Journal Petroleum Technology, December 1970, pages 1499-1506, mentions several prior investigations and concludes "On the basis of these results, we would not expect it to be practical to drive foam through a reservoir. Rather, foam can be expected to improve the sweep of fluid injection processes in heterogeneous reservoirs by reducing or blocking flow in the more permeable zones". Properties of steam foams have been described with respect to their behavior in reservoirs in which an injected gas tends to flow preferentially or substantially exclusively into the most permeable strata. U.S. Pat. Nos. 3,412,793 and 3,994,345 describe uses of steam foams for obtaining the advantages of a noncondensable gas foam-plugging-procedure for temporarily plugging the most permeable layers of a highly stratified reservoir while ensuring that the foam-plug will collapse within a selected time. Those patents indicate no criticality with respect to the surfactant composition and their only indication that any value might be associated with the presence of a noncondensable gas (within a steam foam-forming system) is contained in the statement in column 3, lines 35-40 of U.S. Pat. No. 3,412,793, that "Additionally, small amounts of noncondensable gas could be mixed with the condensable gas in order to vary the life of the foam. In general, however, my invention would be practiced with steam alone because of its low cost and ready availability".

Laboratory and field tests of the present process have indicated that, in the presently specified type of reservoir formation, (1) a given steam foam-forming mixture will create a much greater mobility reduction within a steam channel that is free of oil, (2) only a steam foam-forming mixture of a relatively specific composition will provide a significant mobility reduction within a steam channel that contains a significant proportion of a given crude oil, and (3) the presence of an effective proportion of noncondensable gas appears to be required in order to provide a significant mobility reduction within a steam channel that does contain a significant proportion of crude oil.

The unobvious criticality of the need for the presence of the noncondensable gas was dramatically demonstrated by an accidental interruption of the flow of nitrogen into a steam foam-forming mixture being injected during a field test. A steam foam, formed from a mixture of steam, nitrogen gas and surfactant, was being injected into a steam channel within a reservoir of the presently specified type. The foam injection had increased the bottom hole injection pressure (and thus the pressure gradient within the channel) to about 110 psig for the same rate of fluid inflow at which steam had been injected at 25 psig. When the flow of nitrogen was accidentally interrupted, the bottom hole injection pressure dropped to about 75 psig within two hours, but when the nitrogen inflow was resumed the bottom hole pressure returned to 110 psig within about 12 hours.

FIELD TEST I (PRIOR ART)

Figure 1:
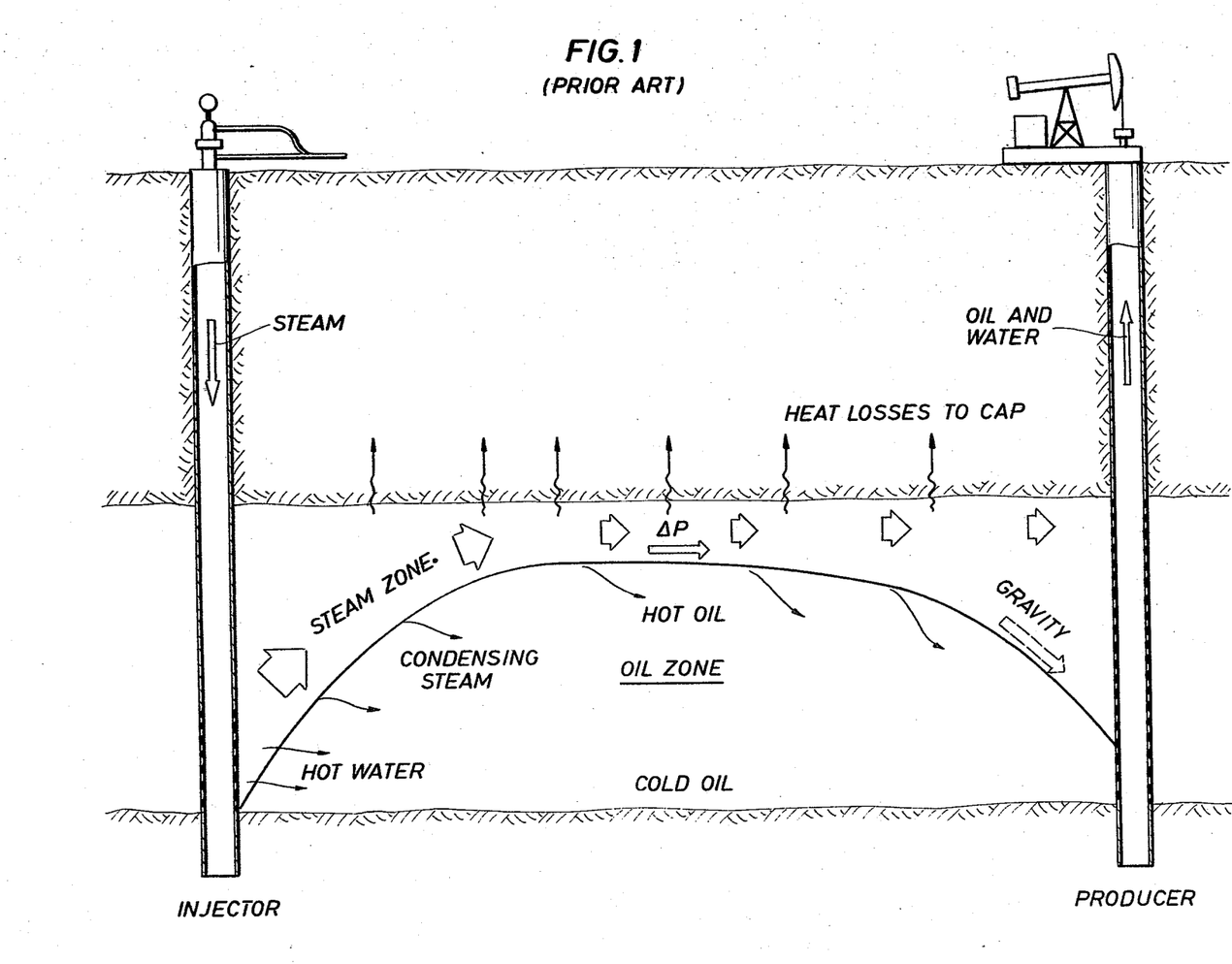
FIG. 1 is a schematic representation of a prior art steam drive oil recovery process in which a steam channel is formed within a relatively non-stratified reservoir and oil is produced by flowing steam through the steam channel.

FIG. 1 is a schematic illustration of the recovery mechanism observed in a field test of a steam drive in a relatively non-stratified viscous oil reservoir. The drawing shows an injection and production well-pair of a 2½ acre, 5-spot pattern. The illustrated oil sand has an average net thickness of 49 feet, and the injection well is selectively completed into the lower 16 feet of the oil sand. That sand is unconsolidated, very fine grain to coarse and pebbly, poorly to well sorted, and relatively clay free. Its average porosity is 31% with permeabilities in the 1 to 10 darcy range. The reservoir oil is 12.8° API gravity, with a viscosity of 6,000 centipoises at 90° F. The oil saturation at the start of the steam drive test was about 65%. The reservoir is located at a depth of about 1100 feet, and the reservoir temperature was about 90° F prior to steam drive.

The steam drive was initiated by injecting a wet steam, of about 70% quality, at rates started at about 900 b/d (of equivalent water) and decreased to rates of about 300 b/d. The injection was effected in response to injection pressures of from about 100 to 200 psi at the well head, and from about 25 to 75 psig at the reservoir face. The absence of oil banking was indicated by the absence of any significant drop in the injection pressure at the time of the heat breakthrough into the production wells. During a three-year test period the steam zone growth was monitored, mainly by neutron logs and temperature profile surveys in observation wells near the injection well. The test data indicated recovery by (1) a drag of oil due to the pressure gradient within the steam zone, which extended from the injection location to the production locations, (2) gravity drainage of condensate and heated oil into the production wells, and (3) a steam zone growth. By the end of the test the pressure in the steam zone was only about 4 psig. The drawdown under a gravity drainage mechanism from the upper portion of the reservoir into the production well is about 20 psi, and the oil production due to drainage mechanism was probably more than that due to the very low pressure gradient within the steam zone. The steam zone did not grow significantly during the three-year test period.

FIELD TEST II (PRESENT INVENTION)

Figure 2:
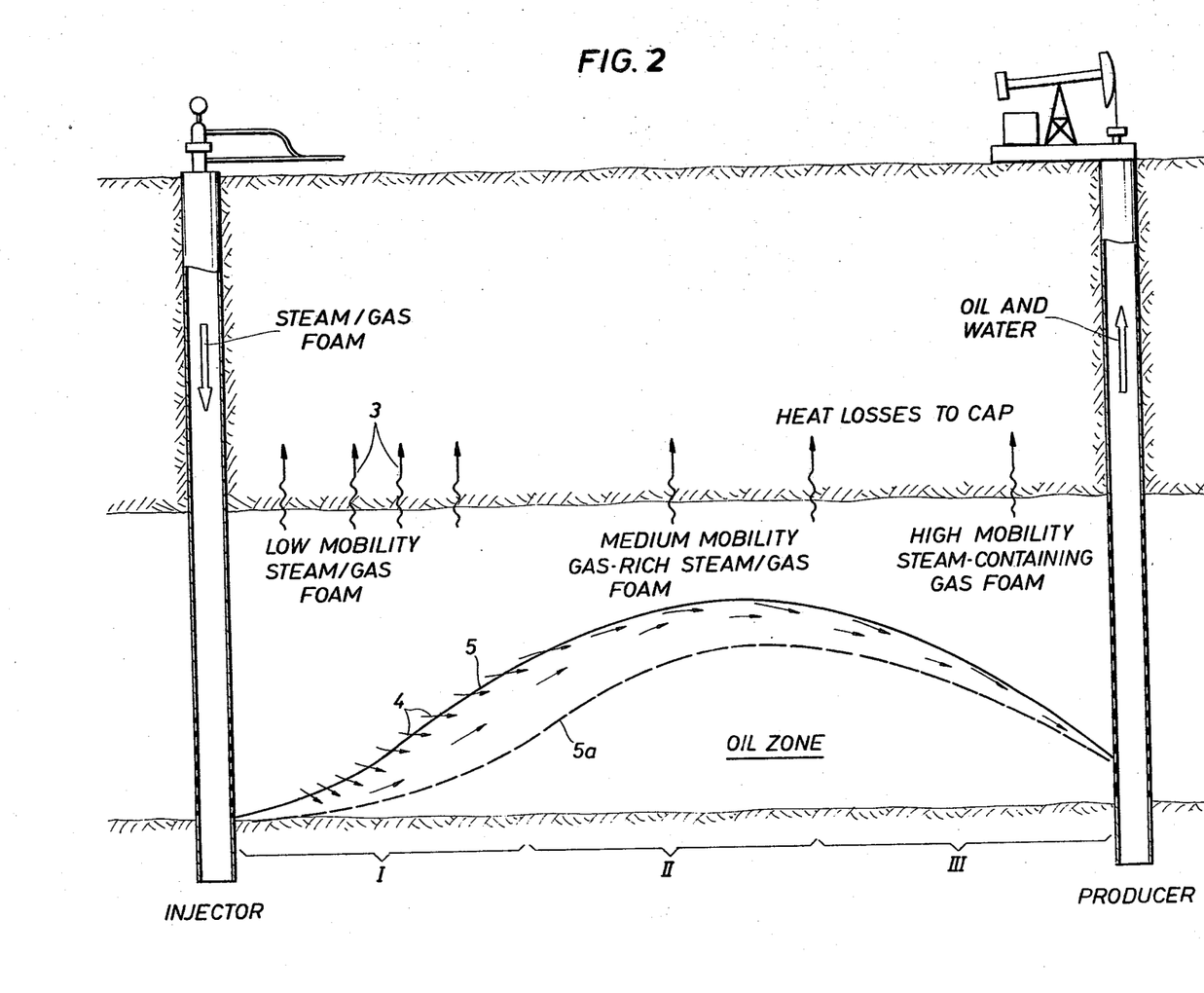
FIG. 2 is a similar representation of the process of the present invention within the same reservoir.

FIG. 2 shows the effects of employing the present process in the reservoir shown in FIG. 1. In this test the initial steps, of injecting steam and producing fluid at horizontally spaced locations within a relatively non-stratified viscous oil reservoir and maintaining rates of injection and production such that a steam breakthrough into a production location becomes at least substantially imminent and an extension of the channel of relatively high steam permeability from an injection location to a production location is at least substantially complete, were effected by means of the steam drive pilot operation of Field Test I. As will be apparent to those skilled in the art, in a preferred procedure for conducting the present process, the initial injection of steam and production of fluid would be continued only long enough to establish the presently specified development of a steam channel. Such a development of a steam channel can be noted by logging sampling the temperature or fluid content of the fluid being produced, or the like.

After the development of the steam channel, the composition of the fluid being injected into it was changed from steam to a mixture of: about 70% quality steam, Siponate DS-10 surfactant, and sodium chloride electrolyte, in proportions such that the liquid portion of the steam contained about 0.83% by weight of the surfactant, and 1.1% by weight of the electrolyte. The steam was flowed at a rate of 273 b/d and mixed with 3.6 scf/m of nitrogen and the mixture was foamed within a conventional foam generator prior to being injected into the well.

The data from the field test, in the light of the results of laboratory studies of the behavior of such mixtures in porous media, suggest that the fluid being injected into and displaced through the steam channel is probably functioning as shown in the FIG. 2. In region I, near the injector, the steam zone is filled with a low mobility Steam/Gas Foam, at a pressure near the injection pressure. The increased pressure increases the pressure gradient within the channel, increases the heat loss to the gas cap (as indicated by the increased density of upwardly directed arrows 3), increases the rate of heating and displacing oil in and along the periphery of the steam channel (as indicated by the arrows 4 near the channel boundary 5), and that displacement of oil both increases the rate of oil production and causes an expansion of the steam channel (as indicated by the dashed-line future steam zone boundary 5a). In the vicinity of the mid-point region II, the Steam/Gas Foam becomes increasingly converted to a Medium Mobility Gas-Rich Steam/Gas Foam, due to the condensing of the steam and diluting of the surfactant system. The Gas-Rich Steam/Gas Foam has a lower pressure and temperature and thus induces a lower rate of heat loss to the cap rock, as well as a lower rate of displacing oil and expanding the steam zone. In region III, near the producer, the Gas-Rich Foam tends to be converted to a High Mobility Steam-Containing Gas Foam. Such a gas foam, along with the steam condensate and the mobilized hot oil, flows into the producer.

Within a few days after starting the injection of the Steam/Gas Foam, the bottom hole pressure in the injection well rose from about 25 psig to about 100 psig, and within about a month it increased to about 110 psig. Concurrently, the rate of oil production increased from about 30 to 70 b/d. The fact that an improvement in areal sweep resulted from the injection of the Steam/Gas Foam was indicated by the rejuvenation of a production well in one corner of the 5-spot well pattern. Prior to the foam injection that well has been shut in because of a lack of productivity. Its production had declined to about one barrel of oil and one barrel of water per day and then became substantially zero (during the injection of steam alone). A few months after the start of the Steam/Gas Foam injection, the fluid level rose in that well and (when placed on pump) it began producing at about 42 barrels of fluid per day with a 50% oil content.

FIELD TEST III (PRESENT INVENTION)

The portion of the reservoir being treated is encountered at a depth of about 650 feet, has a temperature of 85° F, and a thickness of about 450 feet, with a 15° dip. The reservoir permeability is about 600 millidarcies, with a porosity of 25%. The reservoir oil has a gravity of about 13, and a viscosity which is about 6,400 centipoises at 85° F and 11 centipoises at 300° F. Within the treated portion, an oil layer about 200 feet thick underlies a gas layer, of similar thickness, which comprises nitrogen mixed with less than about 20% oil and minor amounts of methane and carbon dioxide, at substantially atmospheric pressure.

After this reservoir had been subjected to several steam soak cycles a steam drive was started in a pattern containing four injection wells, each surrounded by a plurality of producing wells. In a typical injection-production pair of wells, steam of about 70% quality was injected, at a wellhead pressure of slightly less than 150 psi, at rates of initially about 1,000 b/d which were decreased to about 300 b/d. After steam channels had formed (via the overlying gas layer or desaturated zone between the wells) and following steam-injection times of about four to six years during which the injection pressures at the wellheads of the injection wells had declined to about 119 psi with the production being obtained at the relatively low rates established by a gravity drainage of oil heated by steam (flowing only through the steam channels) at substantially atmospheric pressure. The oil-steam ratio for the steam flood was then averaging slightly less than 0.4 b/b. It appeared that, in the early stages of the steam flood, the steam heated significant portions of the oil and reservoir rocks, while traveling into and along the overlying desaturated (or gas) zone. Later the steam paths tended to become desaturated and to serve as steam-confining conduits that transported steam directly into the overlying gas zone without effectively expanding the steam channel by heating the cold oil.

To learn whether the steam foam formulation developed for the preceding field test would be applicable for the additional field test, comparable steam foam drive experiments were performed in Ottawa sand packs containing produced water and residual crude oil from the respective reservoirs. The results, summarized in Table 1, show that the steam foam formulation is comparable in effectiveness in both cases. In both cases the correlations between the compositions of the foam-forming mixture (steam, noncondensable gas and electrolyte-containing aqueous surfactant system) were such that the foams formed provided desirable increases in the effective viscosity of the fluid being injected without plugging the permeable formation with respect to any component of the mixture.

Table 1

| Experiment Number | Source of Reservoir Liquids | Permeability to Steam, Darcies | | | Permeability Reduction Factor[2] |
|---|---|---|---|---|---|
| | | No Oil Present | At $S_{or}$ ~30-45% | With Steady-State Foam | |
| 1 | Prior Field | 5.0 | 1.3 | 0.26 | 0.20 |
| 2 | Prior Field | 4.1 | 0.75 | 0.12 | 0.16 |
| 3 | Additional Field | 4.6 | 1.0 | 0.19 | 0.18 ± 0.02 |
| | | 4.1 | 0.78 | 0.23 | 0.29 |
| 4 | Additional Field | 4.1 | 0.98 | 0.30 | 0.31 |

Table 1-continued

| | | Permeability to Steam, Darcies | | |
|---|---|---|---|---|
| Experiment Number | Source of Reservoir Liquids | No Oil Present | At $S_{or}$ ~30–45% | With Steady-State Foam | Permeability Reduction Factor[2] |
| | | 4.1 | 0.88 | 0.27 | 0.30 ± 0.01 |

1. Both sets of experiments were conducted under the following conditions: injected steam quality = 50%; surfactant system was 0.5 wt.% Siponate DS-10 plus 1 wt.% NaCl in the liquid phase of the foam entering the sand face; Ottawa sand packs mounted vertically with flow from bottom to top; mole fraction of nitrogen in fluids entering sand face = $3.3 \times 10^{-3}$ (constant mass injection rate).
2. Obtained by dividing the permeability to steam at steady-state foam by the permeability to steam at residual oil saturation (no foam).

The composition of the fluid being injected in the field test was then changed to a foam-forming mixture. In each injection well this was a mixture of steam of about 70% quality, Siponate DS-10 surfactant, and sodium chloride electrolyte in proportions such that the liquid portion of the steam contained about 0.83 percent by weight of the surfactant, and 1.1 percent by weight of the electrolyte. The steam was injected at a rate of about 330 b/d per well. Injecting this mixture caused the injection pressures (at the wellhead) to increase from about 119 psi to about 162 psi. After about six days of injecting the mixture, about 4–5 standard cubic feet per minute of nitrogen was added to the inflowing steam for each well. This caused the injection pressures to increase an additional 32 psi to an average of 192 psi. After about five days of injecting the mixture containing nitrogen, the noncondensable gas component was changed from nitrogen to natural gas (consisting essentially of methane). The latter change caused substantially no noticeable alteration in the effective viscosity of the fluid being injected.

It appears likely that in this situation a significant increase in oil production can be obtained while increasing the rate at which the steam channel is expanding downwardly into the oil layer by utilizing alternate injections of a mixture of steam foam-forming components and a mixture of steam and noncondensable gas. The steam-gas mixture injection will desorb surfactant from the rock surfaces and will thus maintain a significant but diminishing proportion of the steam-foam effective viscosity. After the injection pressure declines by significant amounts the fluid being injected will be converted to a mixture of steam-noncondensable gas and surfactant, and such cycles will be repeated.

LABORATORY TESTS

Numerous tests have been conducted, generally using 1-inch diameter and 12-inch long sand packs usually mounted vertically, and arranged for fluid inflow into the bottom of the pack. Pressures were monitored at the inlet and near the ends of 4-inch intervals along the pack. Permeability calculations were based on pressure drops between the interior pressure taps.

Where steam foam drives were conducted in the presence of reservoir oils, the packs were flooded with a typical viscous crude oil at about 210° F to provide oil saturations of about 77% (of the pack pore volume). Hot water floods, usually with about 9.4 pore volumes, were then conducted to reduce the oil saturations to a hot water residual of about 64%. The hot water floods were followed by wet steam drives, using about 8.5 pore volumes of water converted to 50% quality steam, which reduced the oil saturations to a range of 30-50%. At such oil saturations, oil was still being produced by the steam drives, but only as a very small proportion of the total liquid being produced.

EFFECT OF DISSOLVED ELECTROLYTE

Table 2 shows the results of comparative tests of otherwise similar foam-forming mixtures of steam and noncondensable gas with and without an effective proportion of electrolyte in the liquid phase of the steam. The experiments were conducted in Ottawa sandpacks containing a residual Kern River oil saturation of about 30% pore volume. Kern River connate water was used to water-wet the sandpacks. Such tests indicate that a more effective permeability reduction is obtained when the electrolyte is present.

TABLE 2

EFFECT OF ADDED NaCl ON EFFECTIVE PERMEABILITY REDUCTION FOR STEAM/NONCONDENSABLE GAS FOAM IN OTTAWA SAND PACKS

| | | Permeability to Steam (Darcies) | | |
|---|---|---|---|---|
| Experiment Number | Surfactant Solution Composition | Original | At $S_{or}$~30% | With Foam |
| 1.1 | 1% Sip. DS-10*, 0.5% NaCl in $H_2O$ | 5.6 | 1.1 | 0.047 |
| 1.2 | 1% Sip. DS-10, 0.5% NaCl in $H_2O$ | 4.4 | 1.5 | 0.007 |
| 1.3 | 1% Sip. DS-10 in $H_2O$ (no NaCl) | 4.8 | 1.5 | 0.16 |
| 1.4 | 1% Sip. DS-10 in $H_2O$ (no NaCl) | 3.8 | 0.74 | 0.10 |

*Siponate DS-10 (commercial sodium dodecylbenzene sulfonate, from American Alcolac Company).

EFFECT OF OIL WITHIN THE STEAM-PERMEABLE CHANNEL

Comparative tests were made of otherwise equivalent steam foam drives in sand packs with and without a residual oil saturation. The pack sands were Ottawa sands and, in one case, the pack contained 30% pore volume Kern River crude. The steam foam contained 2% Siponate DS-10 and 1% NaCl in the liquid phase of a 50% quality steam mixed with nitrogen in a nitrogen to steam ratio of 0.005 volume/volume. Where the oil was present, the fluctuations of the pressure monitoring transducers were larger than when the oil was absent. This appeared to be due to the fact that noncondensable gas water-vapor liquid water and oil were all flowing in, through, and/or around a complex foam network in the oil-containing packs. However, when the pressures stabilized, it was determined that the effective permeability to steam had been reduced by a factor of 0.008 in the presence of the crude oil; as compared with a corresponding factor of 0.002, plus or minus 0.005 (average of four experiments), in the absence of the oil.

It is thus apparent that the presence of reservoir oil has a significant, but relatively modest, tendency to limit the amount of permeability reduction by the present foam-forming mixtures. However, the presence of oil does make one important difference. Where the steam channel is substantially oil free, the noncondensable gas injectivity is lost soon after a foam bank is formed within the channel. Where a significant amount of oil is present such a loss of noncondensable gas injectivity does not occur.

Figure 3A:
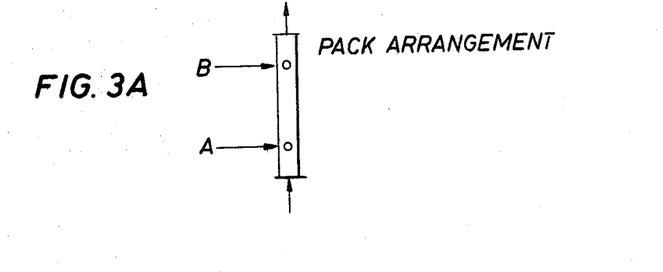
FIG. 3A schematically illustrates a sand pack flow test apparatus.
Figure 3B:
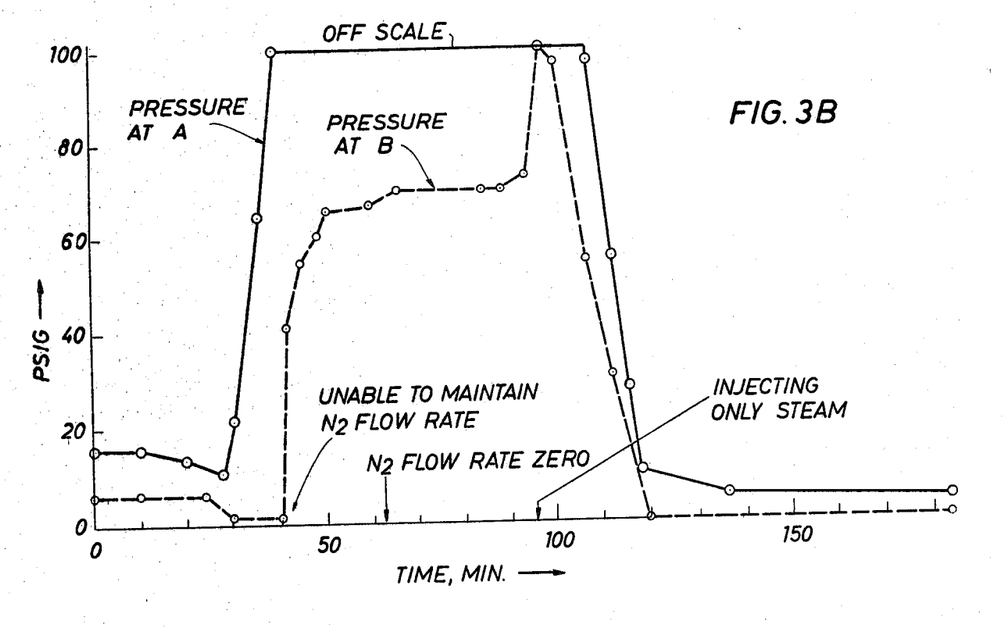
FIGS. 3B, 3C and 4 illustrate plots of pressures or temperatures with time, of fluids flowing through such an apparatus.
Figure 3C:
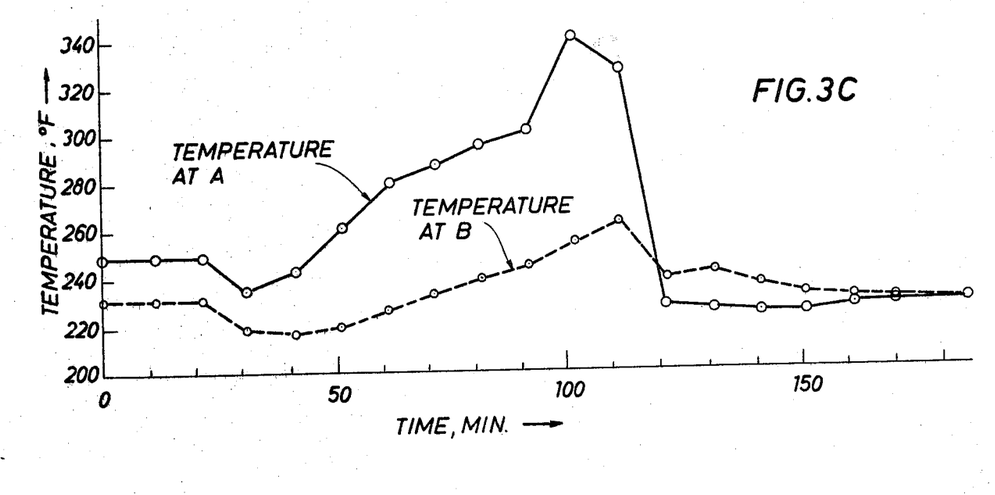

The loss of noncondensable gas injectivity where the steam permeable channel is oil free is typified by experimental results of the type shown in FIGS. 3A to 3C. A steam-foam forming mixture was flowed through an oil-free sand pack which was arranged vertically and provided with internal pressure and temperature transducers at the locations designated A and B, on FIG. 3A. Steam having a quality of about 56% was injected. The initial permeability to steam (based on the pressure drop between the points A and B within the pack) was 4.2 darcies. At the zero times of FIGS. 3B and 3C, a mixture of 2 parts by weight Siponate DS 10 per part by weight of NEODOL 25-3S was injected at 2.8 milliliters per minute through a positive displacement pump into the inflowing stream of steam. Nitrogen was passed through a flow meter at a rate controlled by manually adjusting its delivery pressure up to about 200 psi to provide an initial nitrogen injection rate of 11 milliliters per minute, and an initial nitrogen to steam ratio (volume per volume) of 0.006. The permeability to steam after about the maximum development of foam within the pack was about 0.028 darcies.

As indicated by the notations along the time axis of FIG. 3B, substantially as soon as a good foam bank started to develop, the permeability to the noncondensable gas decreased (in a manner generally typical of the plugging action relative to gas flows of foams formed within permeable media with all of the gas phase being noncondensable). In response to the decreased effective permeability to the nitrogen, its injection pressure was increased to the maximum of 200 psi considered safe for the test apparatus. At that time the constant rate of nitrogen injection could no longer be maintained and the inflow rate of nitrogen soon became zero. From that time on only aqueous surfactant was injected and the foam bank preceded by utilizing the noncondensable gas already in the pack. Soon after the termination of surfactant injection, when only steam was being injected, the pressure dropped rapidly at both the points A and B on FIG. 3A. As will be apparent to those skilled in the art, the sooner and more complete loss of pressure near the outlet end (at location B) is simply an artifact of such a test system and is not representative of the performance within a subterranean reservoir.

As shown in FIG. 3C, the variations in temperature at the points A and B are in general correspondence with the pressure variations.

Figure 4:
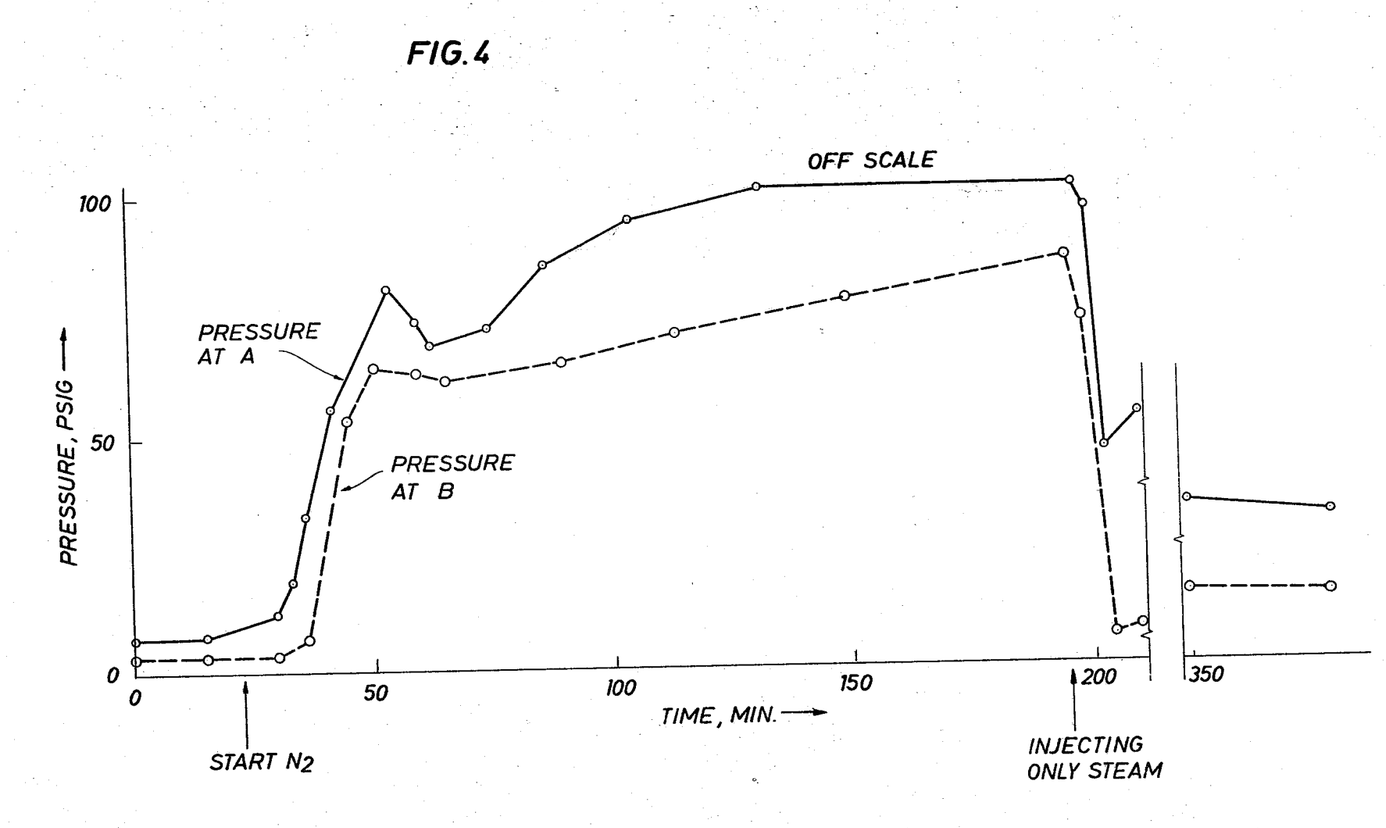

The distinctly different performance with respect to noncondensable gas injectivity that is exhibited where the steam channel (or sand pack) contains a significant amount of oil is typified by experimental results of the type shown in FIG. 4. In obtaining these results, the apparatus used was the same and the conditions were the same except for the following. The sand pack contained Kern River field water and crude oil (at a steam drive oil residual saturation). And, the foam-forming surfactant system used was an aqueous solution containing 2% Siponate DS-10 and 1% sodium chloride. Other tests have indicated that this surfactant system is substantially equivalent to the Siponate DS-NEODOL system (which provided the results of FIGS. 3B and 3C) with respect to its effect on the injectivity to steam within steam permeable channels in the presence or absence of oil.

As shown in FIG. 4, the introduction of nitrogen was started about 23 minutes after the zero time along the time axis. Its introduction caused a rapid and significant increase in the pressures at both the points A and B near the respective inlet and outlet ends of the sand pack. After the start of injecting only steam, the pressures at those points fell rapidly; but, even at 380 minutes after time zero, it is apparent that there was then a significantly greater pressure gradient in the steam channel than there was at the start of the injection of a steam foam-forming mixture.

EFFECT OF SURFACTANT SYSTEM COMPOSITION

As indicated above, a Siponate-containing foam-forming aqueous surfactant system was found to be substantially equivalent in the presence or absence of Kern River crude oil when the electrolyte was either sodium chloride or NEODOL 25-3S. But, in general, the composition of a given foam-forming surfactant system must be correlated with respect to its interaction with, or response to, the oil to be encountered in the steam channel within the reservoir to be treated. Such correlations can be determined by known procedures and/or verified by simple laboratory tests of the flows of steam and steam foam in sand packs of the types described above.

Table 3 shows the results of testing steam-foam-forming properties of numerous aqueous surfactant systems in the presence of Kern River crude oil. The surfactants tested are known to be generally effective for foam formation in other situations. The tests were conducted as described above with a 50% quality steam mixed with an amount of nitrogen providing a mole fraction of 0.003 of the fluid entering the pack.

Table 3

| Expr. No. | Surfactant Used | Permeability to Steam, Darcies | | | |
|---|---|---|---|---|---|
| | | $k_{original}$ | $k_{sor}$ | $k_{foam}$ | k foam/$k_{sor}$ |
| 1 | 0.5% Siponate DS-10, 1% NaCl | 4.1 | 0.75 | 0.12 | 0.16 |
| 2 | 1% Na Lignin Sulfonate | 4.2 | 0.55 | 0.68 | 0.81 |
| 3 | 1% Na Lignin Sulfonate, 2% NaCl | 4.0 | 0.89 | 1.01 | 0.88 |
| 4 | 0.88% Na Lignin Sulfonate, 0.12% Siponate DS-10, 1% NaCl | 4.0 | 0.64 | 0.65 | 1.02 |
| 5 | 1% Ammonium Lignin Sulfonate | 3.8 | 0.93 | 0.74 | 0.79 |
| 6 | 1% Ammonium Lignin Sulfonate 1% $CaCl_2$ | 3.8 | 0.72 | 0.71 | 0.99 |
| 7 | 1% Na Lignin Sulfonate, 1% $CaCl_2$ | 4.4 | 0.90 | 1.11 | 1.23 |

Table 3-continued

| Expr. No. | Surfactant Used | Permeability to Steam, Darcies | | | |
|---|---|---|---|---|---|
| | | $k_{original}$ | $k_{sor}$ | $k_{foam}$ | k foam/$k_{sor}$ |
| 8 | 0.50% Ultrawet DS | 4.3 | 0.73 | 0.72 | 0.99 |
| 9 | 0.55% Ultrawet K, 1% NaCl | 4.6 | 1.3 | 0.8 | 0.62 |
| 10 | 0.83% Petroleum Sulfonate (TRS-12B) 2.3% NaCl | 4.4 | 0.83 | 0.42 | 0.51 |
| 11 | 0.42% Petroleum Sulfonate (TRS-12B), 0.25% Siponate DS-10, 2.3% NaCl | 4.2 | 0.73 | 0.66 | 0.90 |

The K-92S surfactant used in Experiment No. 9 is a synthetic surfactant available from ARCO Chemical Company, which is generally similar to Siponate DS-10. The Ultrawet DS surfactant used in Experiment No. 8 is a synthetic sulfonate available from ARCO Chemical Company, which has a shorter side chain on the benzene ring than Siponate DS-10.

The relatively effectiveness of the surfactant systems listed in Table 3 is indicated by comparing the permeability to steam at residual oil saturation ($K_{sor}$) with permeability to steam in the presence of foam ($K_{foam}$). The Siponate-sodium chloride surfactant system of Experiment 1 was outstandingly effective. It reduced the permeability to steam to about ⅓ of that provided by the next most effective system, the petroleum sulfonate sodium chloride system of Experiment No. 10.

The criticality of the correlation between foam-forming surfactant composition and reservoir crude (relative to optimum efficiency) is indicated by a comparison of Experiments 1, 10 and 11. In Experiment No. 10 and the Siponate used in Experiment No. 1, mixed with sodium chloride. Experiment 11 resulted in a steam permeability nearly six times as great as that of Experiment 1, which used the Siponate and sodium chloride alone.

It is apparent that a petroleum sulfonate surfactant system such as that used in Experiment No. 10 tends to provide a steam-containing gas foam (the fluid formed when the steam component of the steam foam has condensed, as shown in zone III of FIG. 2) which is a relatively effective oil-displacing aqueous surfactant system. Generally a final oil saturation in the range of 12-15% is left in such sand packs after a displacement with a good steam-foam system (such as the system used in Example 1). But, in Experiment No. 10, the final oil saturation which was left by the surfactant system was only 4%. It is thus apparent that, at least in certain situations, it may be desirable to follow the injection of a slug of a mixture of a highly effective, and possible relatively expensive, steam-foam forming surfactant (such as the system of Experiment No. 1) by injecting a slug of a cheaper, and possible less effective steam foam mobility-reducing system, which is more effective in oil-displacement (such as the system of Experiment No. 10). It may also be desirable to inject alternate slugs of an efficient oil-displacing system (such as that of Experiment No. 10) and slugs of only steam and gas. Such variations may tend to recover the maximum amount of oil with minimum chemical cost.

EFFECT OF SURFACTANT PROPORTION

Comparative tests were made with steam foam-forming systems containing varying porportions of surfactant. The concentration of Siponate DS-10 was varied from 2% by weight down to 0.127%, with the sodium chloride concentration being kept at 1 weight percent of the liquid portion of the steam foam. The results of typical tests are listed in Table 4. The effective permeabilities to steam were measured several times in each test. The measurements includes the initial permeability to steam with no oil present. The permeability to steam after the residual Kern River crude saturation had been established are listed as "With $S_{or}$ about 30 to 45%". The permeability to steam during the steam/gas foam injection (under conditions as nearly stabilized as were attainable in a given flow experiment) are listed in the column "In foam at $S_{or}$ about 12 to 15%". And, the permeability to steam after foam injection had been discontinued and several hundred pore volumes of steam had been injected (so that the foam was more or less washed out while the $S_{or}$ remained at about 12 to 15%) are listed in the column "Restored".

TABLE 4

EFFECT OF SURFACTANT CONCENTRATION ON STEAM/NONCONDENSABLE GAS FOAM DRIVE EXPERIMENTS IN OTTAWA SAND PACKS CONTAINING RESIDUAL KERN RIVER CRUDE OIL

| Concentration of Siponate DS-10 in Liquid Portion of Foam Entering the Sand Face | Permeability to Steam, Darcies | | | |
|---|---|---|---|---|
| | No Oil Present | With S ~30-45% or | In Foam at $S_{or}$ ~12-15% | Restored |
| 2.0 | 5.0 | 1.3 | 0.03 | 0.3 |
| 1.0 | 4.3 | 0.5 | 0.12 | 0.6 |
| 0.5 | 4.0 | 0.6 | 0.07 | 0.4 |
| 0.25 | 5.3 | 1.0 | 0.13 | 0.8 |
| 0.12 | 5.1 | 1.2 | 0.18 | 0.7 |

ADSORPTIVITY PROPERTIES OF SIPONATE

Tests were made of the extent of adsorbtive loss of Siponate DS-10 on rocks from the Kern River Reservoir, at temperatures ranging from near room temperature to about steam temperature at atmospheric pressure. Data points were obtained for the adsorbtion of the Siponate from 1% aqueous sodium were obtained for the adsorbtion of the Siponate from 1% aqueous sodium chloride at 30°, 50° and 100° C. The extent of the adsorbtion decreased from high levels at room temperature to low levels at the steam temperature. And, the fact that decreases with temperature occurred over the entire temperature range may indicate that the adsorbtion is physical and reversible. Such a surfactant adsorption mechanism may contribute to maintaining the mobility reducing effects of the present steam/gas foams. Another factor which may contribute to that durability of such effects could be a partitioning of some of the surfactant which had become dissolved in the residual crude oil, back into the aqueous phase, as the temperature is increased.

EFFECTS OF STEAM QUALITY

The effects of steam quality on a foam drive with the present foam-forming systems were tested. Duplicate experiments using about 20% quality steam were compared with an otherwise analogous set of duplicate experiments using 50% quality steam. The details and results are summarized in Table 5. The data indicates that a 20% quality steam causes a further reduction of steam mobility than a 50% quality steam. A possible contributing factor is the fact that, in the lower quality steam, the mass of surfactant present per unit of pore volume is greater than that of a higher quality steam. The surfactant is present in the liquid phase of the foam and the lower steam quality affords a wetter foam, which provides more liquid within the porous medium.

TABLE 5

EFFECT OF STEAM QUALITY UPON STEAM MOBILITY REDUCTION IN STEAM/NONCONDENSABLE GAS FOAM DRIVE EXPERIMENTS [1]

| Experiment Number | Injected Steam Quality,% | Permeability to Steam, Darcies | | | Permeability Reduction Factor[2] |
|---|---|---|---|---|---|
| | | No Oil Present | At $S_{or}$ ~30-45% | With Steady-State Foam | |
| 3.1 | 51 | 5.0 | 1.3 | 0.26 | 0.20 |
| 3.2 | 48 | 4.1 | 0.75 | 0.12 | 0.16 |
| Average | 50 | 4.6 | 1.0 | 0.19 | 0.18 ± 0.02 |
| 3.3 | 19 | 4.4 | 0.43 | 0.010 | 0.023 |
| 3.4 | 16 | 3.9 | 0.47 | 0.009 | 0.019 |
| Average | 18 | 4.2 | 0.45 | 0.010 | 0.021 ± 0.002 |

[1] Both sets of experiments were conducted under the following conditions: surfactant system was 0.5 wt.% Siponate DS-10 plus 1 wt.% NaCl in the liquid phase of the foam entering the sand face; Ottawa sand pack mounted vertically with flow from bottom to top; mole fraction of nitrogen in fluids entering sand face = $3.3 \times 10^{-3}$ (constant mass injection rate).
[2] Obtained by dividing the permeability to steam at steady-state foam by the permeability to steam at residual oil saturation (no foam).

EFFECTS OF NONCONDENSABLE GAS PROPORTION

Comparative tests were made of drives in which, in one case, the noncondensable gas was injected along with the wet steam by a constant volume injection mode and, in the other case, where it was injected on a constant mass basis. Since both modes utilize the same initial noncondensable gas injection rate, this indicates whether the mole fraction of noncondensable gas in the foam system can be significantly reduced without impairing the steam mobility reducing capability. In the tests the initial permeabilities, porosities, etc. were maintained as equal as possible. The surfactant system contained 0.5% by weight Siponate DS-10 plus 1.0 by weight of sodium chloride in the liquid portion of the 50% quality steam. The experiments were conducted in Ottawa sand packs containing residual Kern River crude oil. The constant volume mole at steady state resulted in a foam in which the mode fraction of nitrogen in the fluids entering the sand phase was $17 \times 10^{-3}$. In the constant mass case, the mole fraction was $3.3 \times 10^{-3}$, or only about one-fifth the amount of noncondensable gas. The permeability reduction factors comprising the permeability to steam with foam divided by the permeability to steam at $S_{or}$ with no foam times 100 were, respectively, about 12% and about 18%. This indicates that stronger foams are obtained when the proportion of noncondensable gas is higher.

COMPONENTS SUITABLE FOR USE

In general, the surfactant used in the present process can be substantially any anionic surfactant having foam-forming and adsorptivity properties at least substantially equivalent to those of sodium dodecylbenzene sulfonate with respect to forming a strong foam and undergoing a relatively small and reversible amount of adsorption on revervoir rocks. The surfactant used can advantageously be or include one or more sulfonate surfactants selected from those described in the J. Reisberg U.S. Pat. No. 3,348,611 relating to mixtures of preferentially oil-soluble and preferentially water-soluble alkyl aryl sulfonates, and/or the Reisberg, Lawson and Smith U.S. Pat. No. 3,508,612 relating to mixtures of organic sulfonate surfactants and sulfated oxyalkylated alcohol surfactants.

In the present system the electrolyte content should be sufficient to enhance the foam-forming and interfacial tension lowering capability of the surfactant system. As known to those skilled in the art, some or all of the electrolyte in such a system can comprise an inorganic salt, such as NaCl; and/or a relatively highly water-soluble and plar surface active material, such as a water-soluble alkoxylated alcohol sulfate cosurfactant material. In the latter case, a water-soluble polar surfactant, such as NEODOL 25-3S, can serve a dual role of both inducing foaming and increasing the dissolved electrolyte content of the aqueous liquid. In general, the composition and concentration of the electrolyte should be capable of causing the surfactant system to have an activity, relative to foam-forming and interfacial tension-lowering, which is at least substantially equivalent to that provided by a sodium dodecylbenzene sulfonate system that contains from about 0.1 to 5% of sodium chloride.

The steam generated for use in the present process can comprise substantially any dry, wet, superheated or low grade steam in which the steam condensate and/or liquid components are compatible with and do not inhibit the foam-producing properties of the foam-forming surfactant system. Where a wet steam or low-grade steam (i.e., wet steam in which the liquid phase is a soft saline aqueous liquid) is used, the injected steam quality (weight percent of dry steam mixed with aqueous liquid) is preferably at least about 10%.

In general, the noncondensable gas used in the present process can comprise substantially any gas which (a) undergoes little or no condensation at the temperature and pressure of the steam/gas foam and/or high mobility steam containing gas foam injected into or displaced through a subterranean reservoir in accordance with the present process, and (b) is substantially inert to and compatible with the foam forming surfactant and other components of the steam foam system. Such gas is preferably nitrogen but can also comprise air, ethane, methane, flue gas, fuel gas, etc.

In operating the present process the steam is preferably generated at a surface location. It can be generated by means of substantially any of the commercially available devices and techniques for steam generation. A stream of the steam being injected into the well is preferably mixed, at surface locations, with the selected proportions of aqueous electrolyte solution and/or aqueous foam-forming surfactant, and the noncondensable gas. When the forming and extending of the steam channel has been completed and the composition of the fluid being injected is being changed to a steam foam-forming mixture, the steam quality and the concentration of the electrolyte and surfactant solutions are preferably arranged so that the proportion of aqueous liquid mixed with the steam injected into the well is equivalent to steam of the quality of from about 10 l to 90% (and preferably from about 30 to 80%) and the weight proportions of surfactant dissolved or dispersed in that aqueous liquid is from about 0.1 to 5.0 (and preferably from about 0.2 to 1.0) and the weight per portion of electrolyte dissolved in that liquid is from about 0.1 to 5.0 (and preferably from about 0.2 to 2.0). The amount of noncondensable gas in the mixture preferably comprises from about 0.0003 to 0.3 mole fraction of that fluid. Particularly in the initial stages the steam being injected is preferably mixed with the noncondensable gas and surfactant system upstream of a mixing and/or foam-forming device, so that the fluid injected into the well comprises a steam-gas foam. The devices and techniques by which this is effected can comprise substantially of those which are currently commercially available.

In correlating the composition of the steam-foam-forming mixture with the properties of the rocks and fluid within the reservoir, consideration should be given to (1) the mobility of the steam within the steam channel when the oil saturation within the channel is at or near a steam residual, and (2) the pressure gradient required to inject a given steam-foam-forming mixture and the foam it forms or comprises into and through a porous medium having (a) an oil and water content at least substantially equivalent to that of the steam channel within the reservoir, and (b) a temperature and mobility at least substantially equivalent to those existing within the steam-heated channel within the reservoir. The composition of the steam-foam-forming mixture is adjusted to the extent required to provide a pressure gradient which, in such a situation, exceeds that required for steam alone but does not require any application of a pressure which is likely to fracture the reservoir. As known to those skilled in the art, such determinations can utilize data from numerous well logging, or the like measurements, core analyses, tests of reservoir fluids, and the like. Such determinations can also be conducted (or verified) by means of relatively simple laboratory tests, e.g., the presently described laboratory tests of steam-foam-forming properties of various steam-foam-forming surfactant systems within sand packs.

As indicated above, such properties of such mixtures are responsive to the composition and concentration of (a) the aqueous liquid content of the steam, (b) the noncondensable gas which is mixed with the steam, (c) the surface active material which is dissolved or dispersed in the aqueous liquid phase of the steam, and (d) the electrolyte which is dissolved in that aqueous liquid. Increasing amounts of mobility reduction are provided by increases in (a) the aqueous liquid content of the steam, (b) the gas content of the mixture, (c) the surfactant content of the aqueous liquid in the steam, and (d) the electrolyte content of the aqueous liquid in the steam; although, as known to those skilled in the art, different degrees of effectiveness will be exhibited by different compositions. In general, incremental increases above the necessary minimum proportions have the greatest effects and the amount of the effect per increment tends to decrease with further increases in the proportions of such components.

In adjusting the composition of the fluid being injected (after the injection of the steam-foam-forming mixture has been initiated) to the extent required to maintain a flow of both steam and foam within the steam channel in response to a relatively high pressure gradient without plugging the channel, the desirability of changing the composition can be determined in numerous ways. The objective is the maintaining of a suitably high pressure gradient without undue expense. In general, if the injection pressure (at the wellhead or downhole) is relatively high, the pressure gradient will be relatively high. Since the surfactant tends to be relatively readily adsorbed and desorbed from the reservoir rock, reductions in the porportion of or temporary omission of the surfactant, or converting the most effective surfactant to a lower cost surfactant, particularly one of greater oil displacing efficiency, or the like modifications can advantageously be employed. The effects of such modifications can be monitored by determining effects on injection pressure and/or oil production rate, proportions of oil and water in the produced fluid, temperature or pressure profile within the injection, or production or observation wells, or the like.

What is claimed is:

1. A process for recovering oil from a subterranean reservoir, comprising:

injecting steam and producing fluid at horizontally spaced locations within a portion of a viscous oil reservoir in which the disposition of a steam flow path is determined by the effect of gravity and/or oil distribution, rather than being substantially confined within only one or a few most permeable layers of reservoir rocks;

maintaining rates of steam injection and fluid production such that a steam breakthrough into a production location becomes at least substantially imminent and the extention of a steam channel from an injection location to a production location is at least substantially complete;

changing the composition of the fluid being injected from steam to a steam-foam-forming mixture consisting essentially of steam, noncondensable gas and an aqueous electrolyte-containing solution or dispersion of surfactant;

correlating the composition of the steam-foam-forming mixture with the properties of the rocks and fluids in the reservoir so that the pressure required to inject the mixture and the foam it forms or comprises into and through the steam channel exceeds that required for steam alone but is less than the reservoir fracturing pressure; and adjusting the composition of the fluid being injected into the steam channel to the extent required to maintain a flow of both steam and foam within the channel in response to a relatively high pressure gradient at which the oil-displacing and channel-expanding effects are significantly greater than those provided by steam alone, without plugging the channel.

2. The process of claim 1 in which the surfactant is an anionic surfactant having foam-forming and adsorbtivity properties at least substantially equivalent to those of sodium dodecylbenzene sulfonate with respect to forming a strong foam and undergoing relatively small and reversible amounts of adsorbtion on reservoir rocks.

3. The process of claim 2 in which the steam-foam-forming mixture contains a steam of from about 10 to 90% quality in which the liquid phase contains at least about 0.1% by weight of dissolved or dispersed surfactant and at least about 0.1% by weight dissolved electrolyte, and the amount of noncondensable gas is at least about 0.0003 mole fraction of the injected fluid.

4. The proces of claim 3 in which the steam-foam-forming mixture is foamed before it is injected.

5. The process of claim 4 in which the surfactant comprises sodium dodecylbenzene sulfonate.

6. The process of claim 5 in which the electrolyte is sodium chloride.

7. The process of claim 6 in which the electrolyte is a water soluble alkoxylated alcohol sulfate surfactant.

8. The process of claim 1 in which, after the initiation of injecting a steam-foam-forming mixture, the composition of the fluid being injected is adjusted by terminating the injection of surfactant and electrolyte while continuing the injection of steam and noncondensable gas.

9. The process of claim 8 in which the terminating of surfactant injection is followed by injecting a mixture of steam, noncondensable gas and a surfactant which is different from the previously injected surfactant and has a greater capability for reducing interfacial tension and displacing oil.

10. In a process for producing oil from a portion of a viscous oil reservoir in which the disposition of a steam flow path is determined by the effect of gravity and/or oil distribution rather than being substantially confined within only one or a few most permeable layers of reservoir rocks, in which process steam is injected and fluid is produced at horizontally separated locations until a steam breakthrough has occurred and a steam channel has been extended between those locations, the improvement which comprises:

changing the composition of the fluid being injected from steam to a steam-foam-forming mixture consisting essentially of steam, noncondensable gas and an aqueous electrolyte-containing solution or dispersion of surfactant;

correlating the composition of the steam-foam-forming mixture with the properties of the rocks and fluids in the reservoir so that the pressure required to inject the mixture and the foam it forms or comprises into and through the steam channel exceeds that required for steam alone but is less than the reservoir fracturing pressure; and adjusting the composition of the fluid being injected into the steam channel to the extent required to maintain a flow of both steam and foam within the channel in response to a relatively high pressure gradient at which the oil-displacing and channel-expanding effects are significantly greater than those provided by steam alone, without plugging the channel.

* * * * *